United States Patent

Kawasaki et al.

Patent Number: 5,878,063
Date of Patent: Mar. 2, 1999

[54] METHOD OF DETECTING CELL LOSS AND EXCHANGE PROVIDED WITH CELL LOSS DETECTING FUNCTION

[75] Inventors: Hiroya Kawasaki; Shiro Uriu, both of Kawasaki; Koki Mie, Fukuoka; Yukinaga Toyoda, Fukuoka; Naoki Fukuda, Fukuoka, all of Japan

[73] Assignee: Fujitsu Limited, Kanagawa, Japan

[21] Appl. No.: 854,679

[22] Filed: May 12, 1997

[30] Foreign Application Priority Data

Nov. 19, 1996 [JP] Japan .................................. 8-307594

[51] Int. Cl.⁶ ........................................................ G06K 5/00
[52] U.S. Cl. .............................. 371/65; 370/242; 370/395; 370/389
[58] Field of Search .......................... 371/65, 57.1, 67.1, 371/20.1; 370/216, 218, 242, 244, 395, 389

[56] References Cited

U.S. PATENT DOCUMENTS

| | | | |
|---|---|---|---|
| 5,357,510 | 10/1994 | Norizuki et al. | 370/395 |
| 5,394,396 | 2/1995 | Yoshimura et al. | 370/236 |
| 5,638,360 | 6/1997 | Sugawara | 370/253 |
| 5,671,213 | 9/1997 | Kurano | 370/218 |
| 5,675,587 | 10/1997 | Okuyama et al. | 371/20.1 |

*Primary Examiner*—Trinh L. Tu
*Attorney, Agent, or Firm*—Helfgott & Karas, P C.

[57] ABSTRACT

A cell count identifier inserting portion for inserting a cell count identifier into the header portion of a cell is provided at a predetermined position within an exchange and a plurality of cell counting portions for counting a cell into which a cell count identifier is inserted are provided on the downstream side of the cell count identifier inserting portion. A cell loss detecting portion compares the number of cells into which the cell count identifier is inserted with the number of cells counted by each of the cell counting portions, detects cell loss on the basis of the result of the comparisons and specifies the section in which cell loss is caused, if the cell loss is detected.

8 Claims, 11 Drawing Sheets

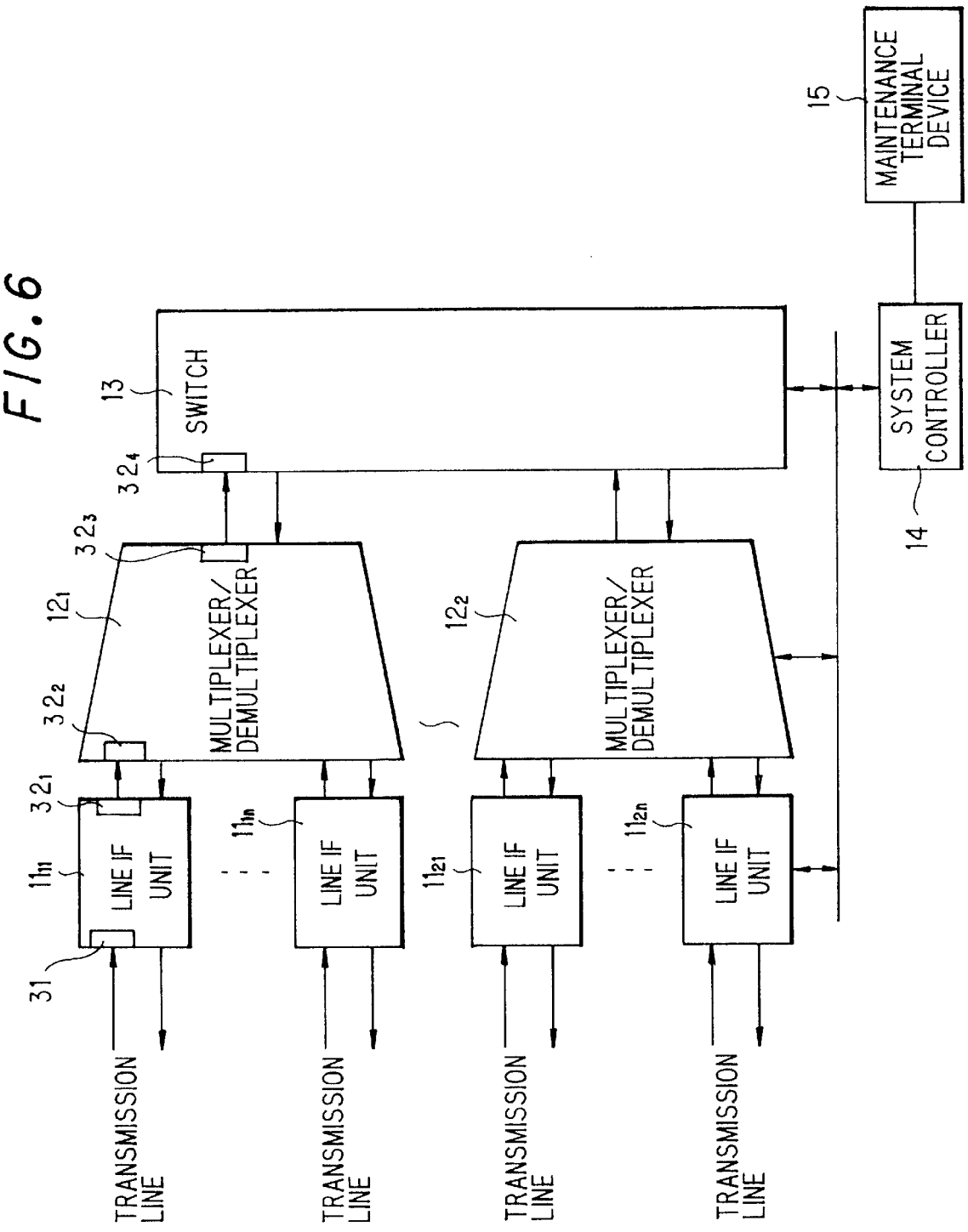

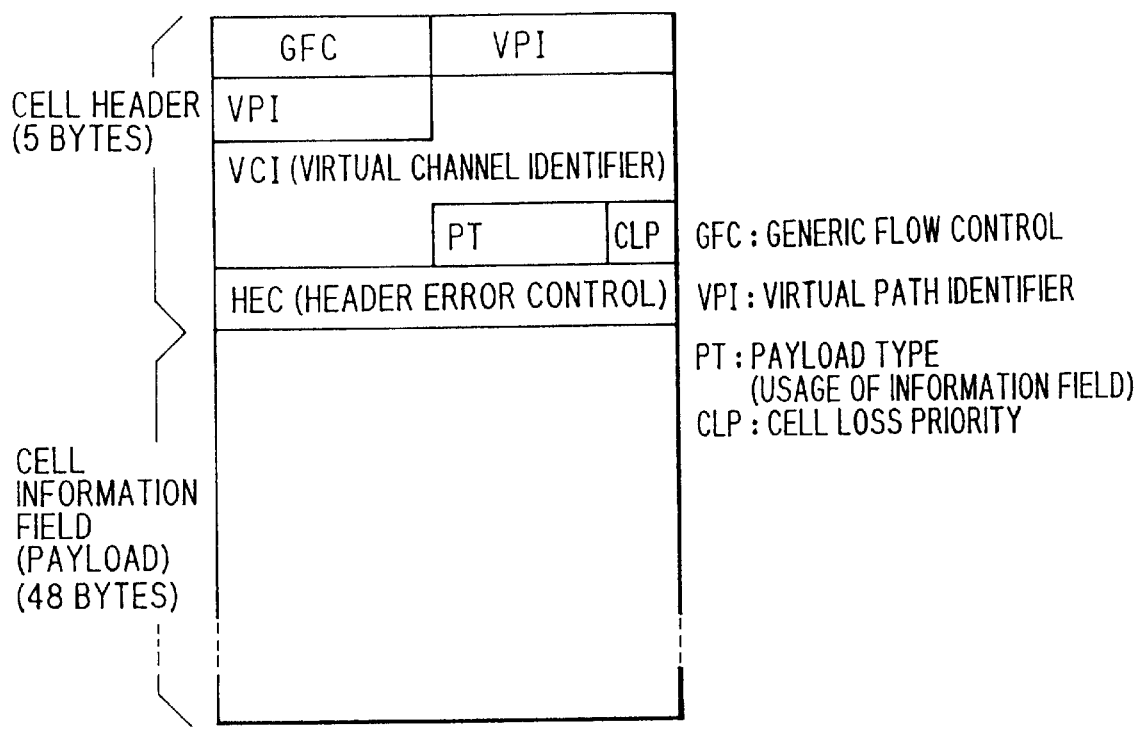

METHOD OF DETECTING CELL LOSS AND EXCHANGE PROVIDED WITH CELL LOSS DETECTING FUNCTION

BACKGROUND OF THE INVENTION

The present invention relates to a method of detecting cell loss and an exchange provided with a cell loss detecting function and, more particularly, to a method of detecting cell loss caused in an exchange and detecting the section in which the cell loss is caused, and an exchange provided with such a function.

There is increasing demand not only for audio communication and data communication but also for multimedia communication in which moving pictures are transmitted as well as audio and data. As a means for realizing such broadband communication, an exchanging technique in a B-ISDN (Broadband-ISDN) system which is based on an asynchronous transfer mode (ATM) is being put to practical use. In the ATM, all the information is converted into fixed length information which is called a cell and is transferred at a high speed. More specifically, in the ATM, a line is allocated to a plurality of calls by setting a multiplicity of logical links on a physical line. The moving picture data and the audio data transmitted from the terminal at each call are separated into information units (which are called ATM cells) having a fixed length, and the cells are serially transmitted to the line, thereby realizing multiplex communication.

Each cell is composed of a block having a fixed length of 53 bytes, as shown in FIG. 8. In the 53 bytes, 5 bytes constitute a header portion and 48 bytes an information field (payload). The header portion includes a virtual channel identifier (VCI) for identifying a call so as to indicate the destination even after the data is separated into blocks. The header portion also includes a virtual path identifier (VPI) for specifying a path, a generic flow control GFC which is used for flow control between links, a payload type (PT), cell loss priority (CLP), a header error control (HEC), etc.

FIG. 9 shows the structure of an ATM exchange system. In FIG. 9, the reference numerals $11_{11}$ to $11_{1n}$, $11_{21}$ to $11_{2n}$, $11_{31}$ to $11_{3n}$, $11_{41}$ to $11_{4n}$ represent line interface units (line IF units) which are connected to the corresponding transmission lines (incoming line, outgoing line), $12_1$ to $12_4$ multiplexer/demultiplexers, 13 an ATM switching unit, 14 a system controller, and 15 a maintenance terminal device. The ATM switching unit 13 is connected to the plurality of multiplexer/demultiplexers $12_1$ to $12_4$, and outputs the cell which is input from a certain multiplexer/demultiplexer to a predetermined multiplexer/demultiplexer. Each of multiplexer/demultiplexers $12_1$ to $12_4$ is connected to a plurality of line IF units $11_{11}$ to $11_{1n}$, $11_{21}$ to $11_{2n}$, $11_{31}$ to $11_{3n}$, $11_{41}$ to $11_{4n}$, respectively, concentrates and multiplexes the up cells from the plurality of line IF units and outputs the multiplexed cell to the ATM switching unit 13. In addition, the multiplexer/demultiplexers $12_1$ to $12_4$ separate the down cells from the ATM switching unit 13 and output the separated cells to the corresponding line IF units.

Each of the line IF units $11_{11}$ to $11_{4n}$ is connected to the corresponding multiplexer/demultiplexers $12_1$ to $12_4$, takes ATM cells out of a payload portion of a predetermined frame type (e.g., SONET FRAME) which is input from a transmission line (incoming line) and thereafter converts the ATM cell format into an internal cell format within the exchange, outputting it to the multiplexer/demultiplexer 12. The internal cell format within the exchange has a construction in which 1 byte is added to an ATM cell format as shown in FIG. 10, and several bits of the 1 byte are used to write routing tag information TAG. The ATM switching unit 13 switches the input cell to a predetermined path by referring to the tag information TAG added thereto.

Each of the line IF units $11_{11}$ to $11_{4n}$ also converts the cell having the internal cell format (FIG. 10) which is input from the multiplexer/demultiplexer into an ATM cell format (FIG. 8), and transmits the ATM cell to the transmission line side after mapping the ATM cell in the payload portion of the SONET FRAME.

The system controller 14 controls the line IF units $11_{11}$ to $11_{4n}$, the multiplexer/demultiplexers $12_1$ to $12_4$ and the ATM switching unit 13.

FIG. 11 shows the structure of the line IF units $11_{11}$ to $11_{4n}$. The reference numeral 1 represents an optical interface portion which is connected to a transmission line composed of optical fibers, and which is provided with an opto-electric converting circuit OE and an electro-optic converting circuit EO. The reference numeral 2 represents a SONET termination/ATM cell conversion portion, which converts an ATM cell format into an internal cell format within the exchange after taking the ATM cells out of the payload of a SONET FRAME. The SONET termination/ATM cell conversion portion 11 also converts the internal cell format input from the switch side into an ATM cell format, and transmits the ATM cell to the transmission line side after mapping the ATM cell in the payload portion of a SONET FRAME. The reference numerals 3a, 3b denote ATM layer performance monitors (MCCG) for monitoring the degree of performance degrade of the transmission line, and 4 an OAM cell processor which inserts or extracts an OAM cell. The reference numeral 5 represents a usage parameter controller which is provided with a function of preventing an extraordinary amount of cell (violator cell) beyond a predetermined band from entering the exchange due to a line trouble or the like.

An accounting portion 6 which executes an accounting operation for cells is provided with a function of measuring the flow rate of cells. The flow rate is measured for every cell having a different VPI value or VPI/VCI value. The reference numeral 7 denotes an interface portion connected to the switch side, 8 a microprocessor for controlling the line IF units as a whole, 9 a memory (DRAM) for working the microprocessor 8 and storing data, and 10 a flash memory for storing a boot program. Each of the elements 2 to 10 is connected by a bus, and the microprocessor 8 executes (1) control of looping a test cell, (2) control of collection and transmission of traffic data such as accounting information (traffic control), (3) control of alarm monitoring by an OAM cell, and the like.

As described above, since all information is transmitted and received in the form of a cell having a fixed length in the ATM, high-speed data transfer by a hardware is possible, thereby enabling high-speed data communication and high-quality image communication.

There is a case, however, in which cell data is lost (cell loss) in a module (ATM exchange module) which realizes ATM exchange due to a trouble in the hardware or the like. In this case, it is impossible to realize high-speed data communication and high-quality image communication. It is therefore necessary to quickly detect the loss (cell loss) of cell data in an ATM exchange module and to specify the section in which the cell loss is caused so as to repair and maintain the section.

It is, however, conventionally impossible to detect cell loss and to specify the section in which cell loss is caused by a simple method.

SUMMARY OF THE INVENTION

Accordingly, it is an object of the present invention to eliminate the above-described problems in the related art and to provide a method of detecting cell loss and specifying a section in which the cell loss is caused by a simple method.

It is another object of the present invention to provide a method of detecting the loss of a cell which has a specific VPI value or VCI value and specifying a section in which such cell loss is caused by a simple method.

To achieve these objects, in a first aspect of the present invention, there is provided a method of detecting cell loss in an exchange comprising the steps of: providing a cell count identifier inserting portion for inserting a cell count identifier into the header portion of a cell, at a predetermined position within the exchange; providing a cell counting portion for counting a cell into which a cell count identifier is inserted, on the downstream side of the cell count identifier inserting portion; comparing the number of cells into which a cell count identifier is inserted with the number of cells counted by the cell counting portion; and detecting cell loss on the basis of the result of the comparison.

In a method of detecting cell loss in an exchange provided in a second aspect of the present invention, the cell counting portions for counting a cell into which a cell count identifier is inserted are provided at a plurality of positions within the exchange; the number of cells into which a cell count identifier is inserted is compared with the number of cells counted by each of the cell counting portions; whether or not there is cell loss is judged on the basis of the result of the comparisons; and if cell loss is detected, the section in which the cell loss is caused is specified.

In a method of detecting cell loss in an exchange provided in a third aspect of the present invention, the cell count identifier inserting portion is instructed to insert a cell count identifier; the number of cells into which a cell count identifier is inserted is compared with the number of cells counted by the cell counting portion after a preset time; and whether or not there is cell loss is judged on the basis of the result of the comparison.

In a method of detecting cell loss in an exchange provided in a fourth aspect of the present invention, the cell count identifier inserting portion inserts a cell count identifier only into the header portion of a cell having a predetermined VPI value or VCI value; the number of cells into which a cell count identifier is inserted is compared with the number of cells counted by the cell counting portion; and whether or not there is cell loss is judged on the basis of the result of the comparison.

Other features and advantages of the present invention will be apparent from the following description taken in conjunction with the accompanying drawings.

BRIEF DESCRIPTION OF THE DRAWINGS

FIG. 6 is an explanatory view of the arrangement of the CCF inserting portion and the CCF counting portions for detecting cell loss in an exchange module;

FIG. 8 is an explanatory view of an ATM cell format;

DESCRIPTION OF THE PREFERRED EMBODIMENTS (a) Entire structure

Figure 1:
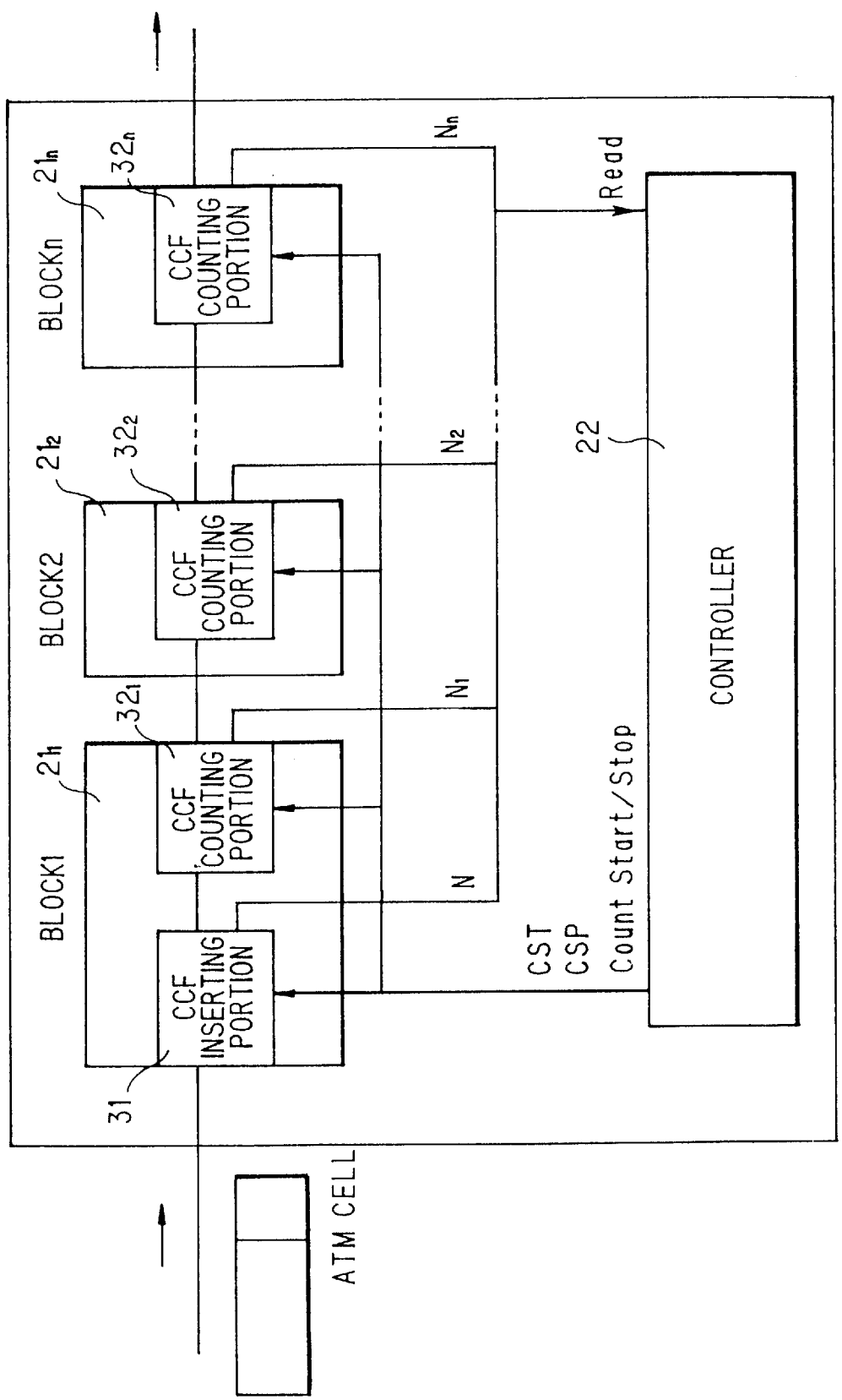
FIG. 1 shows the structure of an embodiment of a method of detecting cell loss.
Figure 9:
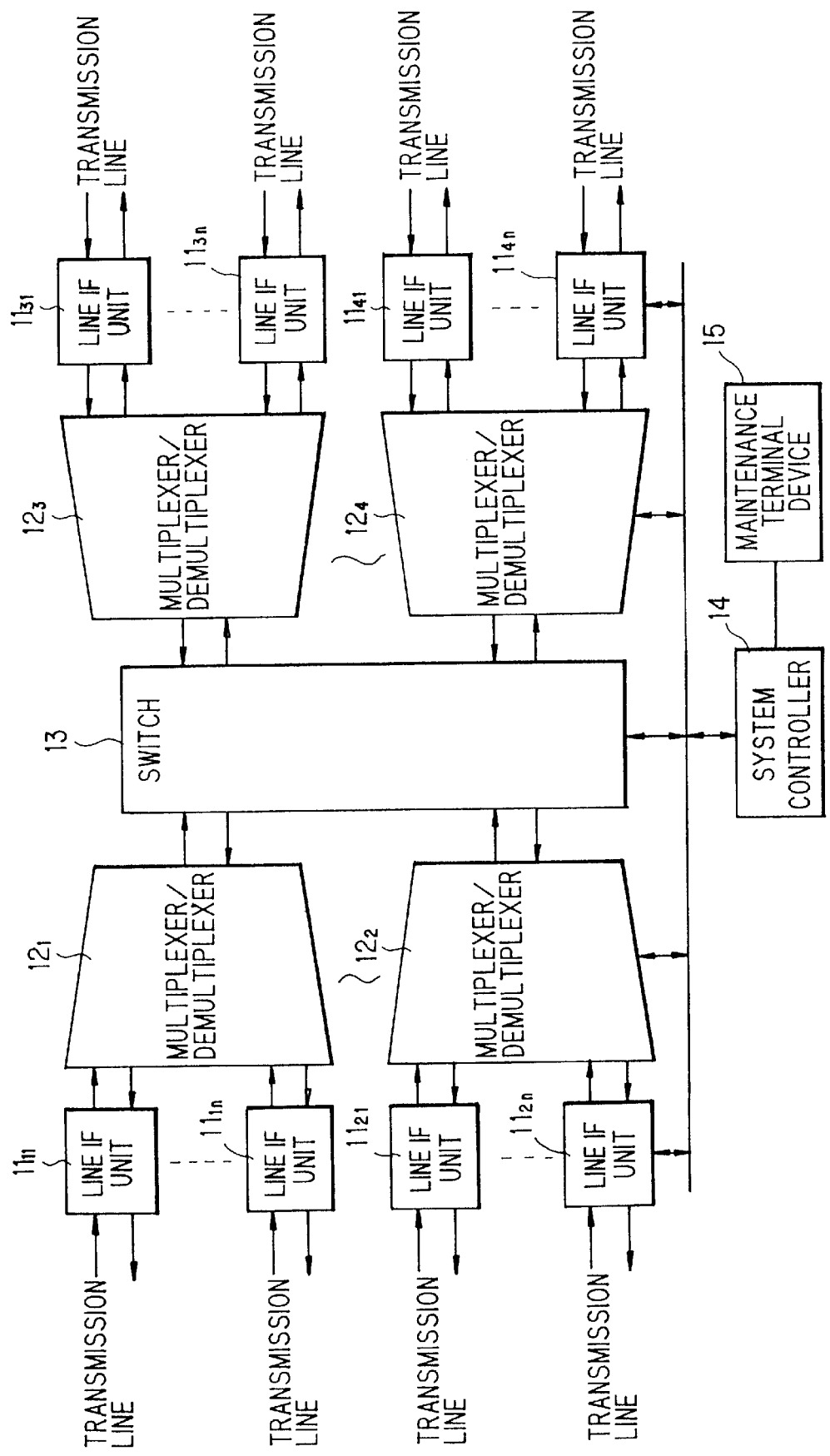
FIG. 9 shows the structure of an ATM exchange system.
Figure 10:
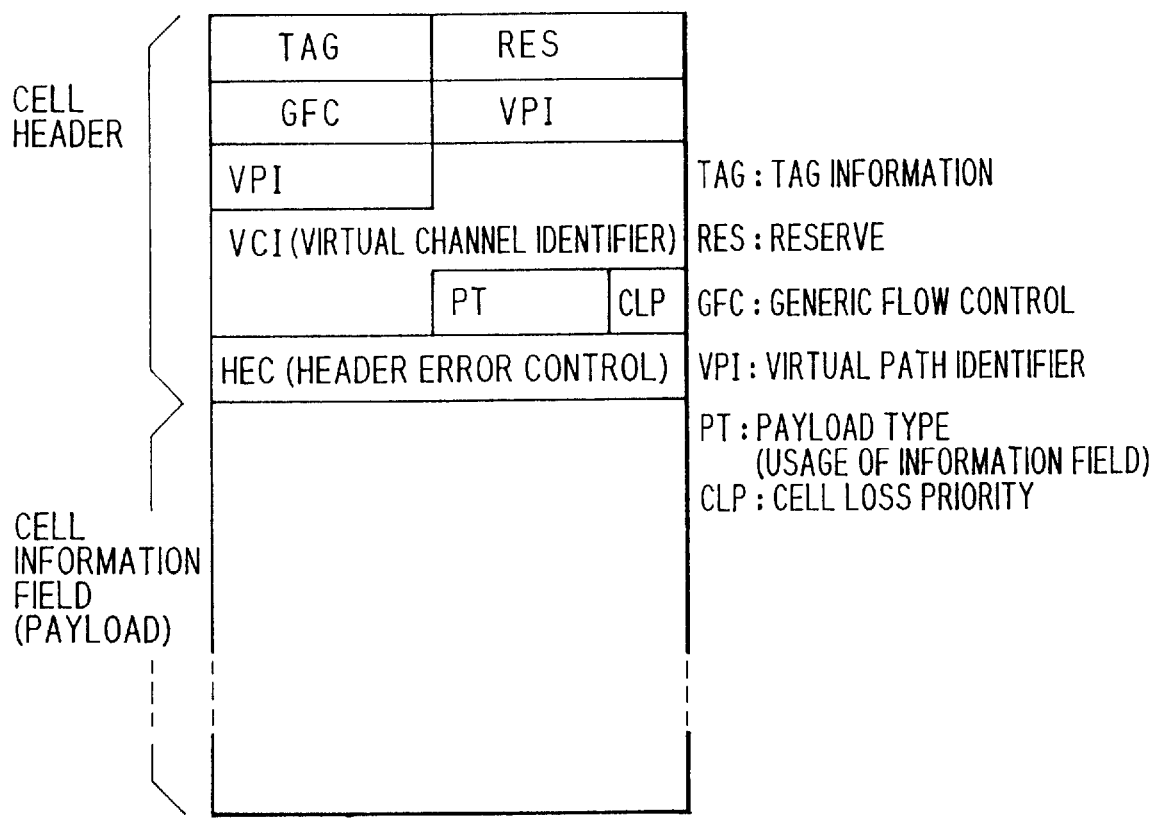
FIG. 10 is an explanatory view of a cell format within a switch.
Figure 11:
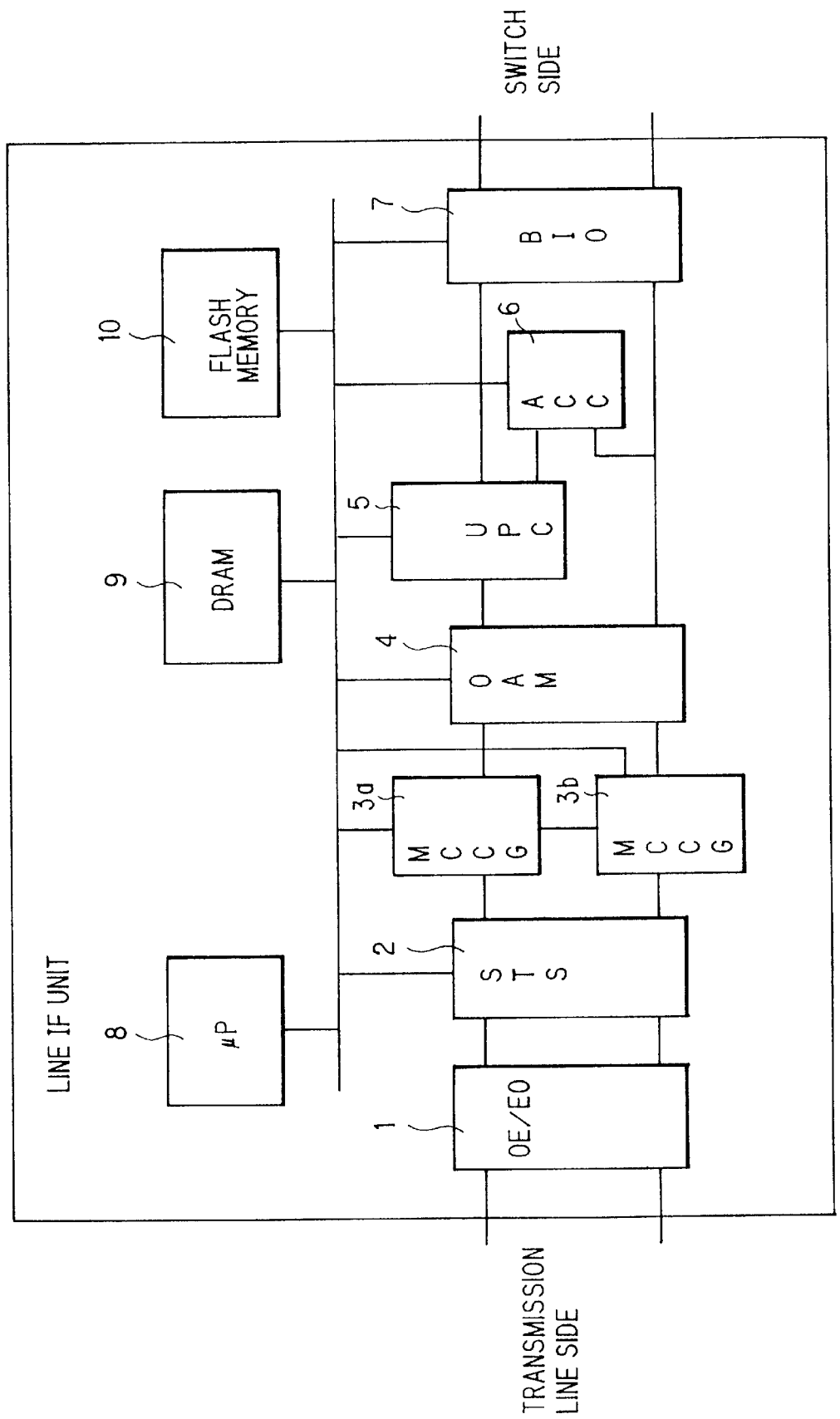
FIG. 11 shows the structure of a line IF unit.

FIG. 1 shows the structure of an ATM exchange module for realizing a method of detecting cell loss according to the present invention. In FIG. 1, the reference numerals $21_1$ to $21_n$ represent blocks which constitute an ATM exchange, 22 a controller for controlling the detection of cell loss. An ATM cell is transmitted in the direction indicated by the arrow. The blocks $21_1$ to $21_n$ may be line IF units, multiplexer/demultiplexers, switching unit . . . , as shown in FIG. 9. Alternatively, they may be SONET termination/ATM cell conversion portion, ATM layer performance monitor (MCCG), OAM cell processor, usage parameter controller, accounting portion, interface portion connected to the switch side, etc. which constitute a line IF unit, as shown in FIG. 11.

Figure 2:
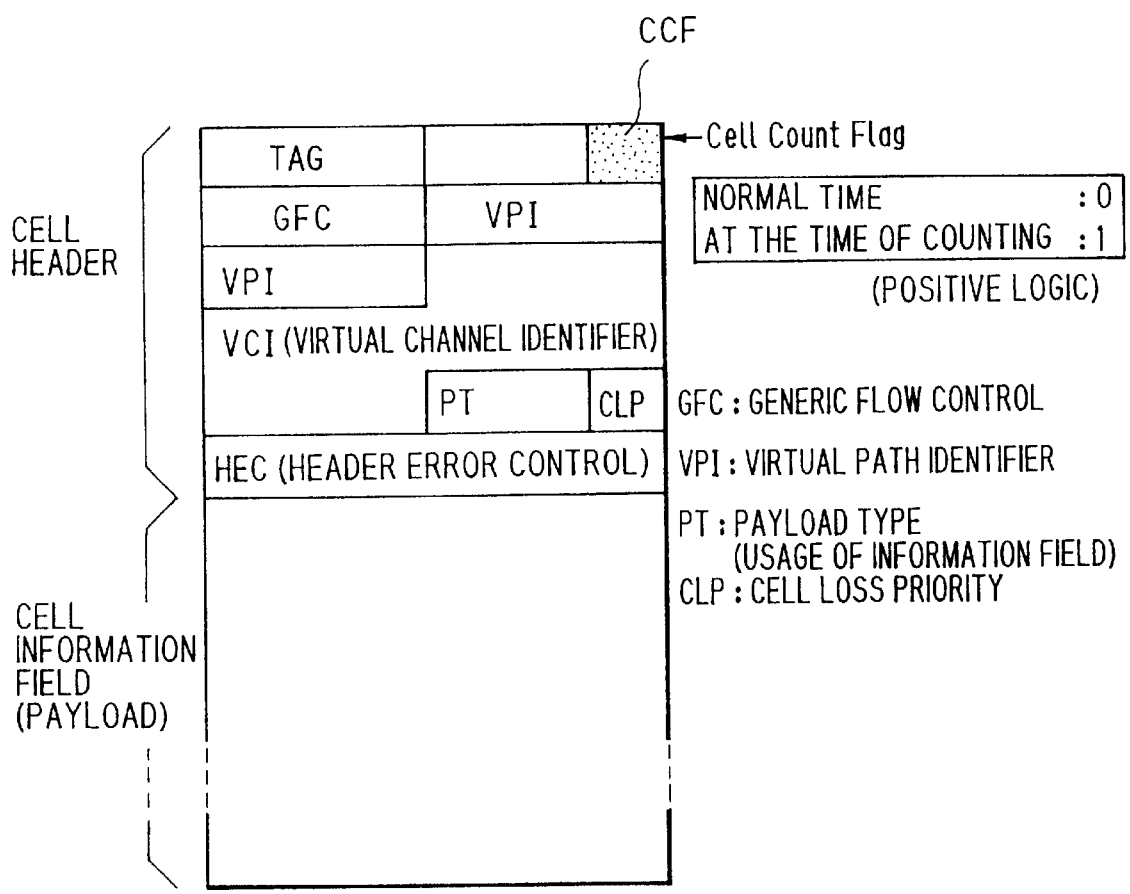
FIG. 2 is an explanatory view of a format of a cell for detecting cell loss.

The reference numeral 31 denotes a cell count flag inserting portion for inserting a cell count flag (CCF) of 1 bit into an internal cell format in a switch, as shown in FIG. 2. The reference numeral $32_1$ to $32_2$ denote cell counting portions (CCF counting portions) which are provided on the downstream side of the cell count flag inserting portion (CCF inserting portion) so as to count the number of cells into which the cell count flag is inserted.

(b) CCF inserting portion and CCF counting portion

Figure 3A:
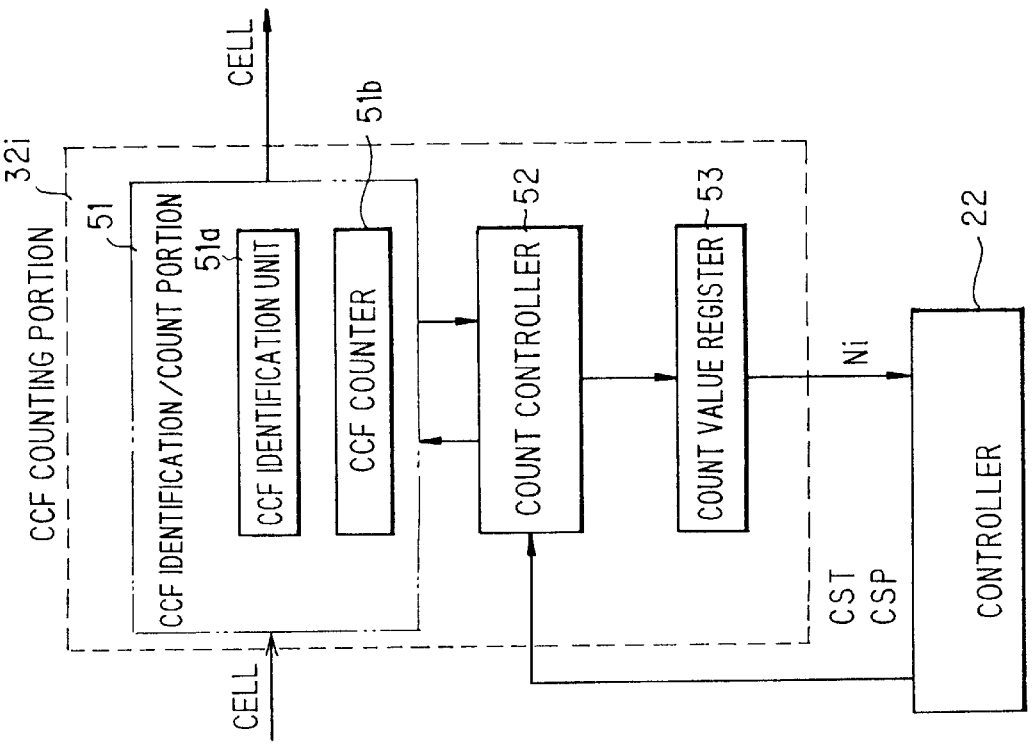
FIG. 3A shows the structure of a CCF inserting portion.

The CCF inserting portion 31 is composed of a CCF insertion/count portion 41, a count controller 42, and a count value register 43, as shown in FIG. 3A. The CCF insertion/count portion 41 includes a CCF insertion portion 41a for inserting a CCF which shows a cell to be counted into a cell header portion, and a counter 41b for counting the number of cells into which a CCF is inserted. The count controller 42 instructs the CCF insertion/count portion 41 to insert a CCF and to count the number of cells into which a CCF is inserted by a count start command CST from the controller 22. Under the instruction, the CCF insertion portion 41a inserts a CCF into a cell which arrives and thereafter outputs the cell, and the counter 41b clears the preceding count value and counts the number of cells into which a CCF is inserted thereafter. The count controller 42 also instructs the CCF insertion/count portion 41 to stop the insertion of a CCF by a count stop command CSP from the controller 22 and stores the count value of the counter 41b into the count value register 43. The number N of cells with a CCF inserted thereto which is stored in the count value register 43 is read by the controller 22.

Figure 3B:
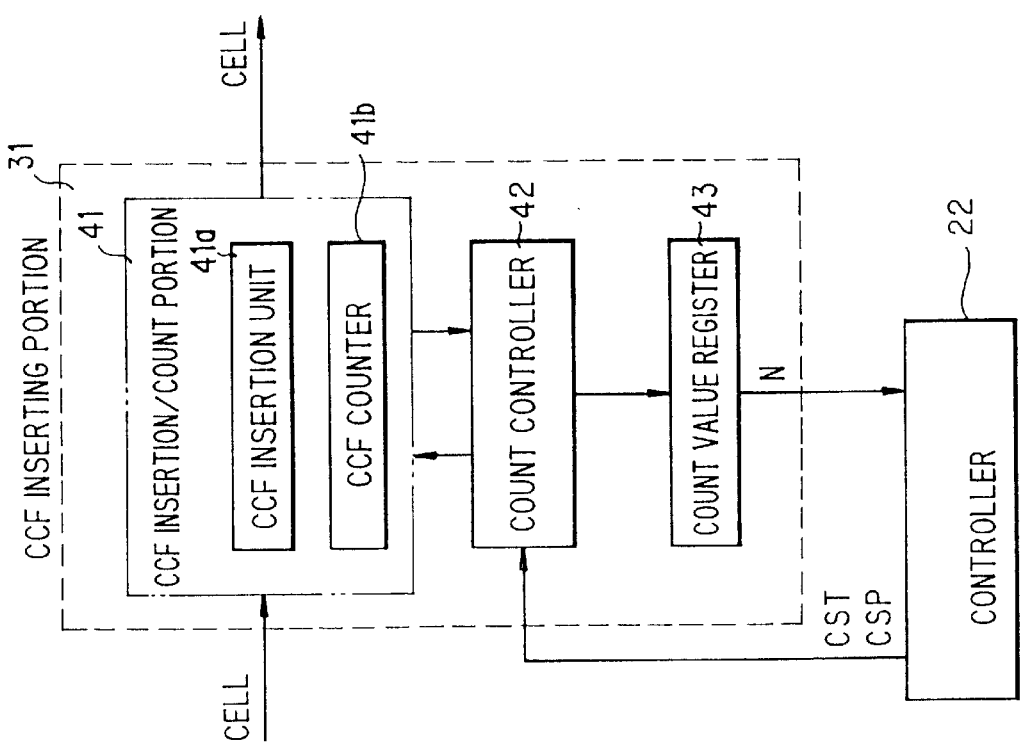
FIG. 3B shows the structure of a CCF counting portion.

Each of the CCF counting portions $32_1$ to $32_n$ is composed of a CCF identification/count portion 51, a count controller 52, and a count value register 53, as shown in FIG. 3B. The CCF identification/count portion 51 includes a CCF identification unit 51a for identifying a CCF and a counter 51b for counting the number of cells into which a CCF is inserted. The count controller 52 instructs the CCF identification/ count portion 51 to start the identification of a CCF and to count the number of cells into which a CCF is inserted by a count start command CST from the controller 22. Under the instruction, the CCF identification unit 51a identifies a cell with a CCF inserted thereto which arrives and the counter 51b clears the preceding count value and counts the number of cells in which a CCF is identified. The count controller 52 also instructs the CCF identification/count portion 51 to stop the identification of a CCF by a count stop command CSP from the controller 22 and stores the count value of the counter 51b into the count value register 53. The number Ni of cells with a CCF identified which is stored in the count value register 53 is read by the controller 22.

(c) Cell loss detection processing

Figure 4:
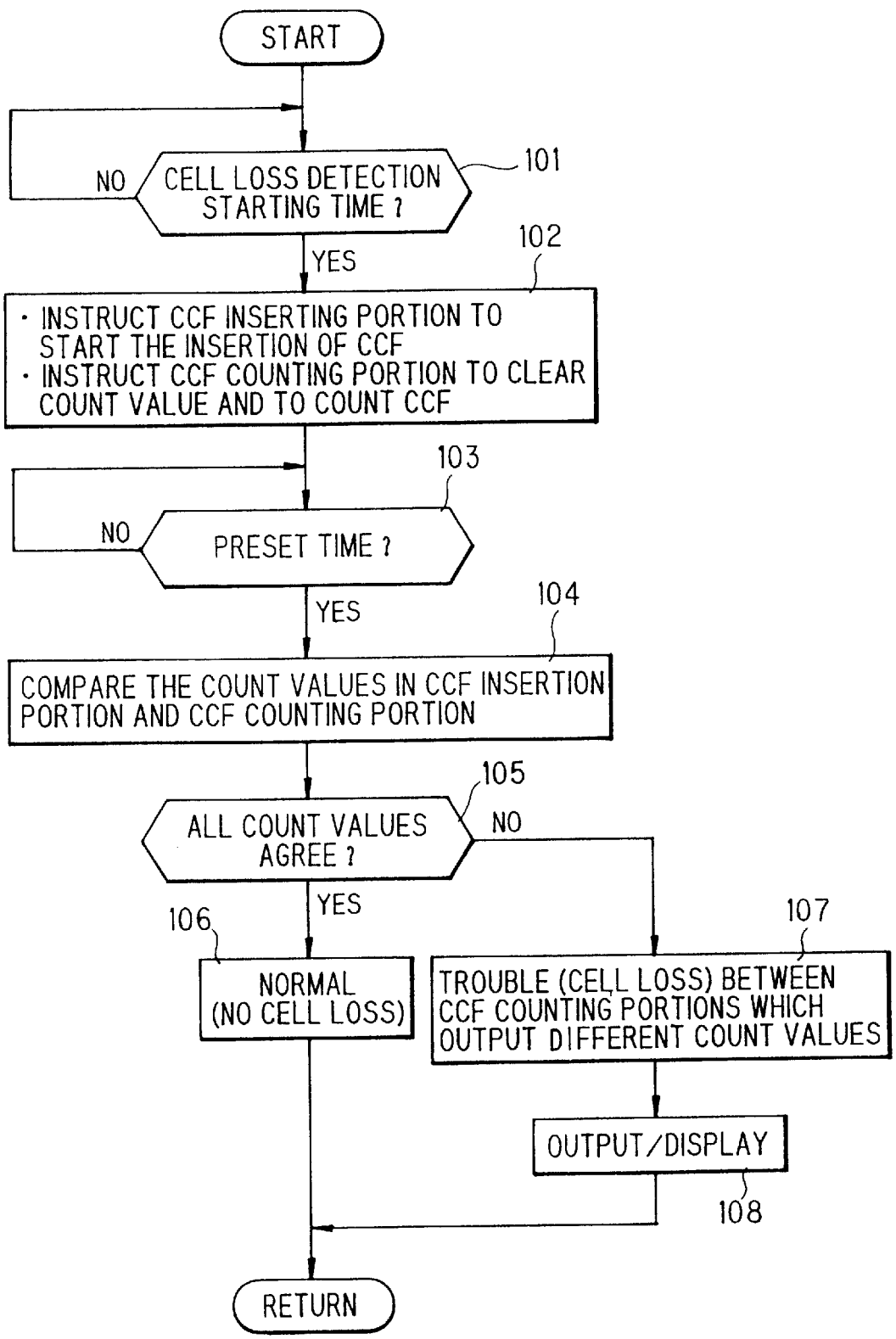
FIG. 4 is a flowchart of cell loss detection processing.

FIG. 4 is a flowchart of cell loss detection processing.

The controller 22 periodically executes cell loss detection processing. When cell loss detection starting time comes (step 101), the controller 22 transmits a count start command CST to the cell count flag inserting portion 31 and each of the CCF counting portions $32_1$ to $32_n$ (step 102). The cell count flag inserting portion 31 clears the number of cells with a CCF inserted thereto which is counted and held at the preceding time, to zero, inserts a CCF into a cell which arrives thereafter, outputs the cell, and counts the number N of cells into which a CCF is inserted. Each of the CCF counting portions $32_1$ to $32_n$ clears the count number which is counted and held at the preceding time, to zero, identifies a cell with a CCF inserted thereto which arrives thereafter, and counts the number $N_1$ to $N_n$ of cells in which a CCF is identified.

The controller 22 then judges whether or not the time elapsed from the start of cell loss detection has reached a preset time (step 103), and if the answer is NO, the operation at step 102 is continued until the preset time. That is, the CCF insertion portion 31 continues the insertion of a CCF and the counting of the number N of cells with a CCF inserted thereto, while each of the CCF counting portions $32_1$ to $32_n$ continues the identification of a cell with a CCF inserted thereto, and the counting of the number $N_1$ to $N_n$ of cells in which a CCF is identified.

When the elapsed time reaches the preset time, the controller 22 transmits the count stop command CSP to the CCF inserting portion 31 and each of the CCF counting portions $32_1$ to $32_n$ so as to stop the insertion of a CCF and the identification of a cell with a CCF inserted thereto, takes each of the count values N, $N_1$ to $N_n$ from the CCF inserting portion 31 and each of the CCF counting portions $32_1$ to $32_n$, and compares the count values N, $N_1$ to $N_n$ (step 104).

The controller 22 then judges whether or not all the count values N, $N_1$ to $N_n$ agree with one another (step 105), and if the answer is in the affirmative, the controller 22 judges that no cell loss is caused so that the ATM exchange module is normal (step 106), and waits for the next cell loss detection starting time so as to repeat the processing after the step 102. When the count values N, $N_1$ to $N_n$ are compared, N is first compared with $N_1$, then $N_1$ is compared with $N_2$, and so forth until $N_{n-1}$ is compared with $N_n$.

On the other hand, if all the count values N, $N_1$ to $N_n$ do not agree with one another, the controller 22 judges that cell loss is caused between the CCF counting portions which output different count values (step 107). For example, if the count values $N_1$ and $N_2$ disagree, the controller 22 judges that cell loss is caused between the block $21_1$ and the block $21_2$.

The controller 22 then displays the occurrence of cell loss and the section in which the cell loss is caused on the display of a maintenance terminal device (step 108), and the process returns to the start so as to repeat the processing thereafter.

A maintenance man quickly inspects and repairs the abnormal part in accordance with the display of the occurrence of cell loss and the section in which the cell loss is caused.

(d) Arrangement of CCF inserting portion and each CCF counting portion

Figure 5:
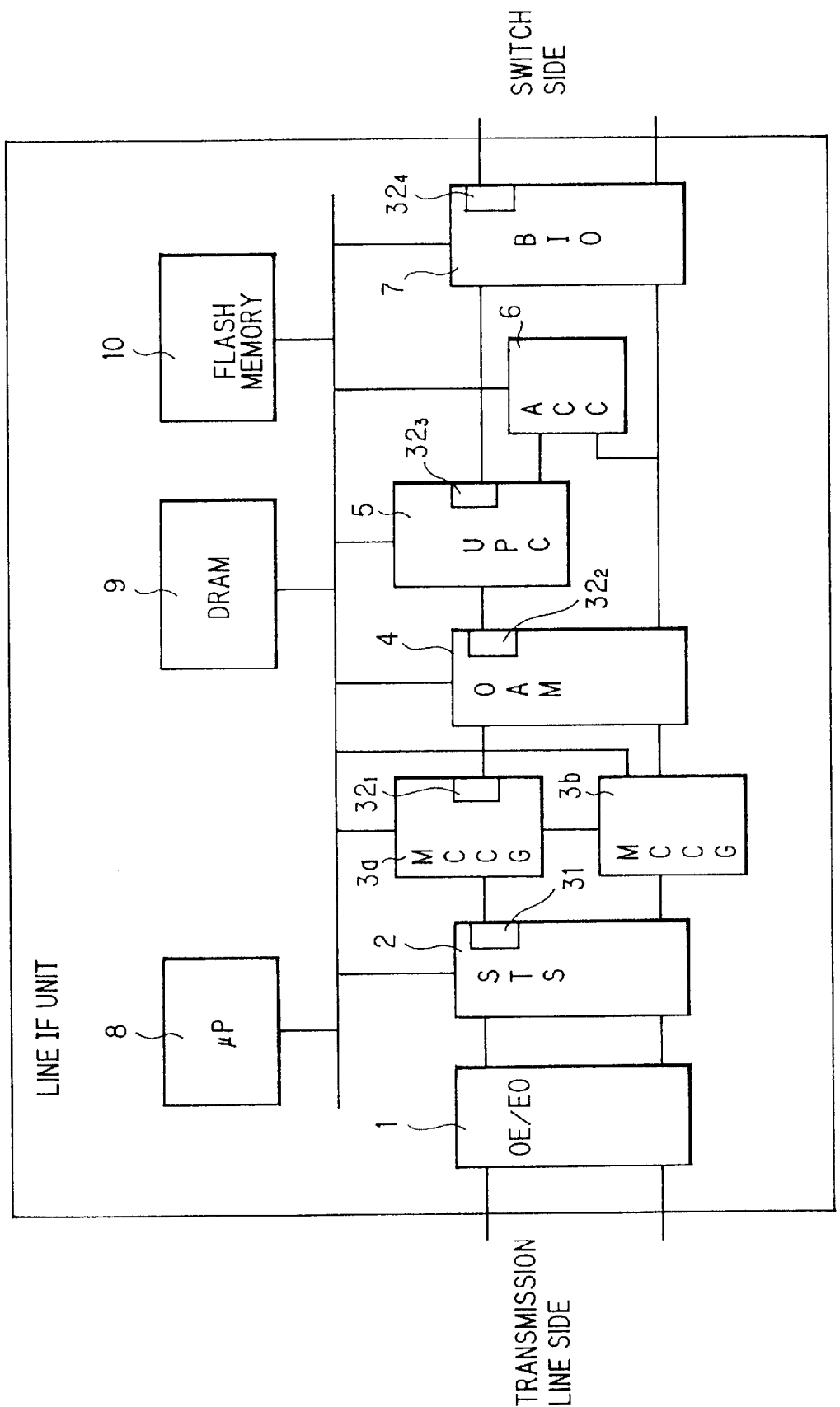
FIG. 5 is an explanatory view of the arrangement of the CCF inserting portion and the CCF counting portions for detecting cell loss in a line IF unit.

FIG. 5 is an explanatory view of the arrangement of the CCF inserting portion 31 and each of the CCF counting portions $32_1$ to $32_n$ for detecting cell loss in a line IF unit. The same reference numerals are provided for the elements which are the same as those shown in FIG. 11.

In the case of detecting cell loss in a line IF unit, for example, the CCF inserting portion 31 is disposed on the output side of the SONET termination/ATM cell conversion portion 2, and the CCF counting portions $32_1$ to $32_4$ are disposed on the output sides of the ATM layer performance monitor (MCCG) 3a, the OAM cell processor 4, the usage parameter controller 5, and interface portion 7 connected to the switch side, respectively, and cell loss is detected and the section in which the cell loss is caused is judged under the control of the microprocessor 8.

FIG. 6 is an explanatory view of the arrangement of the CCF inserting portion 31 and the CCF counting portions $32_1$ to $32_n$ for detecting cell loss in an ATM exchange module. The same reference numerals are provided for the elements which are the same as those shown in FIG. 9.

In the case of detecting cell loss in the ATM exchange, for example, the CCF inserting portion 31 is disposed on the output side of the SONET termination/ATM cell conversion portion 2 (see FIG. 5), and the CCF counting portions $32_1$ to $32_4$ are disposed on the output side of the interface portion 7 (FIG. 5) connected to the switch side of the line IF unit $11_{11}$, on the input side and the output side of the multiplexer/demultiplexer $12_1$, and on the input side of the ATM switch 13, respectively, and cell loss is detected and the section in which the cell loss is caused is judged under the control of the system controller 14.

The arrangements of the CCF inserting portion 31 and the CCF counting portions $32_1$ to $32_n$ shown in FIGS. 5 and 6 are only examples, and they can be disposed at arbitrary positions. However, it is necessary to provide each of the CCF counting portions $32_1$ to $32_n$ on the downstream side of the CCF inserting portion 31.

(e) Detection of cell loss on the basis of VPI value or VCI value

In the above-described embodiments, a CCF is attached to all cells which arrive at the CCF inserting portion 31. Alternatively, it is possible to insert a CCF only into a cell which has a predetermined VPI value or VCI value for the purpose of detecting cell loss.

Figure 7A:
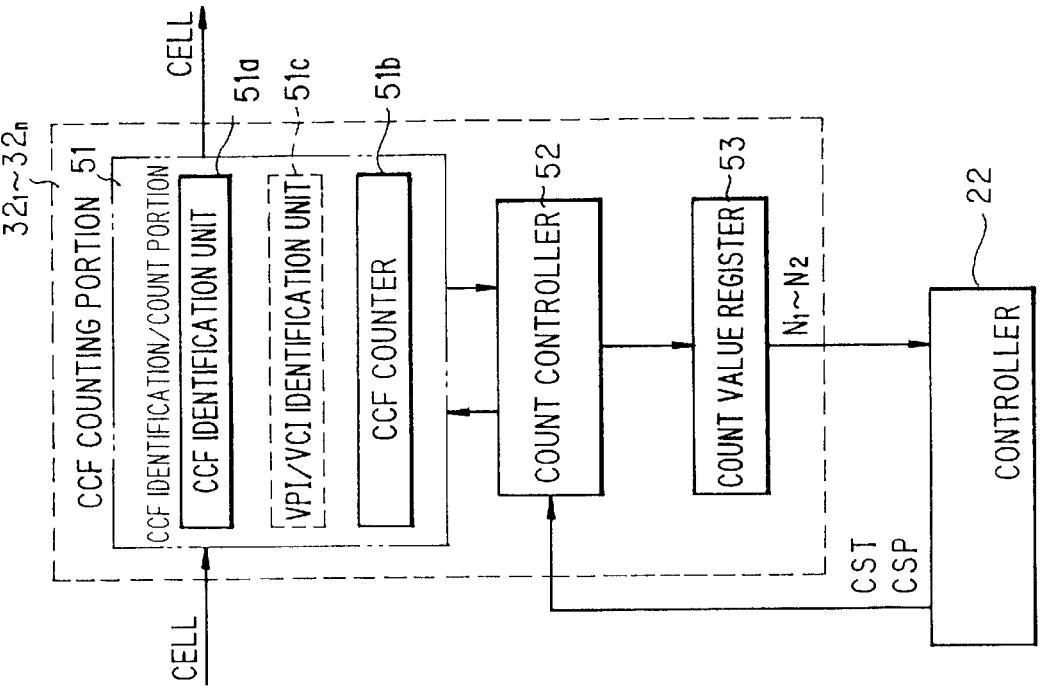
FIG. 7A shows the structure of a CCF inserting portion for inserting a CCF only into a cell having a predetermined VPI value or VCI value.
Figure 7B:
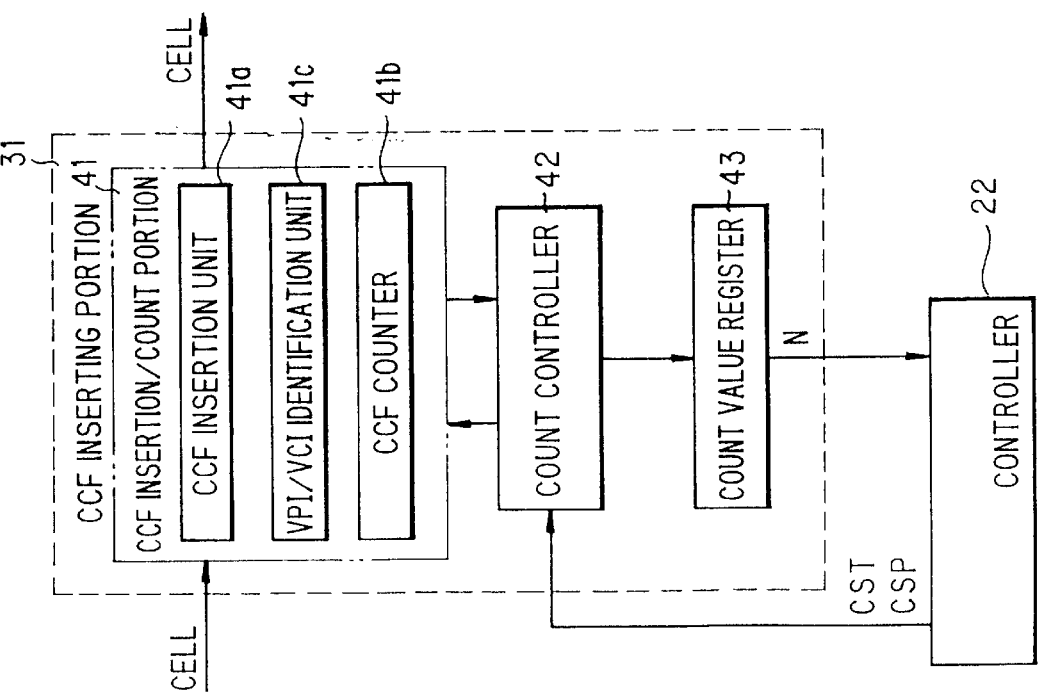
FIG. 7B shows the structure of a CCF counting portion for identifying and counting a cell into which a CCF is inserted.

FIGS. 7A and 7B show structures of the CCF inserting portion 31 and the CCF counting portion 32 when a CCF is inserted only into a cell having a predetermined VPI value or VCI value for the purpose of detecting cell loss. The same reference numerals are provided for the elements which are the same as those shown in FIGS. 3A and 3B.

The CCF inserting portion 31 is composed of a CCF insertion/count portion 41, a count controller 42, and a count value register 43, as shown in FIG. 7A. The CCF insertion/count portion 41 includes a CCF insertion portion 41a for inserting a CCF into the header portion of a cell which has a predetermined VPI value or VCI value designated by the controller 22, a counter 41b for counting the number of cells into which a CCF is inserted, and a VPI/VCI value identification unit 41c for storing the VPI value or VCI value designated by the controller 22 and identifying a cell having the VPI value or VCI value. When a count start command CST including a predetermined VPI/VCI value is issued from the controller 22, the count controller 42 supplies the designated VPI/VCI value to the CCF insertion/count portion 41 and instructs it to insert a CCF into the header portion of a cell which has the VPI/VCI value and to count the number of cells into which a CCF is inserted. Under the instruction, the CCF insertion portion 41a inserts a CCF into a cell which arrives and which has the designated VPI/VCI value, thereafter outputs the cell, and the counter 41b clears the preceding count value and counts the number of cells into which a CCF is inserted thereafter. The count controller 42 also instructs the CCF insertion/count portion 41 to stop the insertion of a CCF by a count stop command CSP from the controller 22 and stores the count value of the counter 41b into the count value register 43. The number N of cells with a CCF inserted thereto which is stored in the count value register 43 is read by the controller 22.

Each of the CCF counting portions $32_1$ to $32_n$ has the same structure as that shown in FIG. 3B. That is, each is composed of a CCF identification/count portion 51, a count controller 52, and a count value register 53, as shown in FIG. 7B. The CCF identification/count portion 51 includes a CCF identification unit 51a for identifying a CCF as an identifier of an object of count and a counter 51b for counting the number of cells into which a CCF is inserted. The count controller 52 instructs the CCF identification/count portion 51 to start the identification of a CCF and to count the number of cells into which a CCF is inserted by a count start command CST from the controller 22. Under the instruction, the CCF identification unit 51a identifies a cell with a CCF inserted thereto which arrives and the counter 51b clears the preceding count value and counts the number of cells in which a CCF is identified. The count controller 52 also instructs the CCF identification/count portion 51 to stop the identification of a CCF by a count stop command CSP from the controller 22 and stores the count value of the counter 51b into the count value register 53. The number $N_1$ to $N_n$ of cells with a CCF identified which is stored in the count value register 53 is read by the controller 22.

It is also possible to add a VPI/VCI identification unit 51c indicated by the rectangle of broken lines to the CCF counting portions $32_1$ to $32_n$ so that the CCF identification/count portion 51 can identify and count a cell which has the VPI/VCI value designated by the controller 22 and into which a CCF is inserted. For example, when a count start command CST for instructing the counting of cells which have the VPI/VCI value=023/8FFF (HEX) only is issued from the controller 22, the CCF inserting portion 31 inserts a CCF only into a cell which has the designated VPI/VCI value, and the CCF counting portions $32_1$ to $32_n$ identifies and counts the cells which have the VPI/VCI value=023/8FFF (HEX) and into which a CCF is inserted. Cells which have a different VPI/VCI value are not counted.

As described above, according to the present invention, since a cell count flag inserting portion for inserting a cell count flag into the header portion of a cell is provided at a predetermined position within an exchange and a cell counting portion for counting a cell into which the cell count flag is inserted is provided on the downstream side of the cell count flag inserting portion so that the number of cells into which the cell count flag is inserted may be compared with the number of cells counted by the cell counting portion, it is possible to detect cell loss in the ATM exchange module on the basis of the result of the comparison.

According to the present invention, since a cell counting portion for counting a cell into which the cell count flag is inserted is provided at a plurality of positions within the exchange, and the number of cells into which the cell count flag is inserted is compared with the number of cells counted by each of the cell counting portions, it is possible to judge whether or not there is cell loss on the basis of the result of the comparisons, and to detect the section in which the cell loss is caused.

According to the present invention, since the cell count flag inserting portion is instructed to periodically insert a cell count flag, and the number of cells into which a cell count flag is inserted is compared with the number of cells counted by the cell counting portion after a preset time, it is possible to detect cell loss automatically, and quickly if the period is shortened.

In addition, according to the present invention, since a cell count flag is inserted only into a cell having a predetermined VPI value or VCI value, it is possible to detect the loss of a cell which passes the ATM exchange module and which has a specific VPI/VCI value. It is also possible to detect cell loss on a multiplicity of paths at the same time by varying the VPI/VCI value.

As many apparently widely different embodiments of the present invention can be made without departing from the spirit and scope thereof, it is to be understood that the invention is not limited to the specific embodiments thereof except as defined in the appended claims.

What is claimed is:

1. A method of detecting cell loss in an exchange comprising the steps of:

providing a cell count identifier inserting portion for inserting a cell count identifier into the header portion of a cell, at a predetermined position within an exchange;

providing a cell counting portion for counting each cell into which said cell count identifier is inserted, on a downstream side of said cell count identifier inserting portion;

comparing the number of cells into which said cell count identifier is inserted with the number of cells counted by said cell counting portion; and detecting cell loss on the basis of the result of the comparison.

2. A method of detecting cell loss according to claim 1, further comprising the steps of:

instructing said cell count identifier inserting portion to insert said cell count identifier;

comparing the number of cells into which said cell count identifier is inserted with the number of cells counted by said cell counting portion after a preset time; and judging whether or not there is cell loss on the basis of the result of said comparison.

3. A method of detecting cell loss according to claim 1, wherein said cell count identifier is inserted only into the header portion of a cell having a predetermined VPI value or VCI value.

4. A method of detecting cell loss in an exchange comprising the steps of:

providing a cell count identifier inserting portion for inserting a cell count identifier into the header portion of a cell, at a predetermined position within an exchange;

providing a plurality of cell counting portions for counting each cell into which said cell count identifier is inserted, on a downstream side of said cell count identifier inserting portion;

comparing the number of cells into which said cell count identifier is inserted with the number of cells counted by each of said cell counting portions; and detecting cell loss on the basis of the result of the comparisons and specifying a section in which cell loss is caused, if said cell loss is detected.

5. A method of detecting cell loss according to claim 4, further comprising the steps of:

instructing said cell count identifier inserting portion to insert said cell count identifier;

comparing the number of cells into which said cell count identifier is inserted with the number of cells counted by each of said cell counting portions after a preset time; and judging whether or not there is cell loss on the basis of the result of said comparisons.

6. A method of detecting cell loss according to claim 4, wherein said cell count identifier is inserted only into the header portion of a cell having a predetermined VPI value or VCI value.

7. An exchange provided with a function of detecting cell loss, said exchange comprising:

a cell count identifier inserting portion provided at a predetermined position so as to insert a cell count identifier into the header portion of a cell;

a cell counting portion provided on a downstream side of said cell count identifier inserting portion so as to count each cell into which said cell count identifier is inserted;

a cell loss detecting portion for comparing the number of cells into which said cell count identifier is inserted with the number of cells counted by said cell counting portion, and detecting cell loss on the basis of the result of the comparison.

8. An exchange provided with a function of detecting cell loss and detecting section in which the cell loss is caused, said exchange comprising:

a cell count identifier inserting portion provided at a predetermined position so as to insert a cell count identifier into the header portion of a cell;

a plurality of cell counting portions provided on a downstream side of said cell count identifier inserting portion so as to count each cell into which said cell count identifier is inserted; and a cell loss detecting portion for comparing the number of cells into which said cell count identifier is inserted with the number of cells counted by each of said cell counting portions, detecting cell loss on the basis of the result of the comparisons and specifying a section in which cell loss is caused, if said cell loss is detected.

* * * * *